United States Patent [19]

Ueshima et al.

[11] 4,028,482

[45] June 7, 1977

[54] POLYMERS OF ACID ANHYDRIDE TYPE NORBORNENE DERIVATIVES AND A METHOD OF PREPARING THE SAME

[75] Inventors: Takashi Ueshima, Yokohama; Yasuzi Tanaka, Kawasaki; Shoichi Kobayashi, Yokohama, all of Japan

[73] Assignee: Showa Denko Kabushiki Kaisha, Tokyo, Japan

[22] Filed: Sept. 19, 1974

[21] Appl. No.: 507,556

[30] Foreign Application Priority Data

Sept. 25, 1973 Japan ............................ 48-106902

[52] U.S. Cl. ............................... 526/271; 260/874; 526/57; 526/91; 526/136; 526/142; 526/143; 526/144; 526/250; 526/251; 526/259; 526/263; 526/272

[51] Int. Cl.[2] ..................... C08F 5/00; C08F 1/42

[58] Field of Search .......... 526/259, 271, 272, 266; 260/47 UA

[56] References Cited

UNITED STATES PATENTS

| 3,494,897 | 2/1970 | Reding | 260/78.5 |
| 3,546,183 | 12/1970 | Vergne | 260/78.4 R |
| 3,557,062 | 1/1971 | Vergne | 260/78.4 R |
| 3,856,758 | 12/1974 | Ueshima | 260/78.4 N |
| 3,859,265 | 1/1975 | Hepworth | 260/85.5 R |

*Primary Examiner*—Christopher A. Henderson, Jr.
*Attorney, Agent, or Firm*—Carroll F. Palmer

[57] ABSTRACT

Polymers or copolymers of acid anhydride type norbornene derivatives and a method of preparing the same, said polymers or copolymers being formed with a reduced viscosity of 0.1 to 20 by ring-opening polymerization of acid anhydride type norbornene derivatives having at least one carboxylic anhydride group or a mixture of said norbornene derivatives and cycloolefins.

1 Claim, 1 Drawing Figure

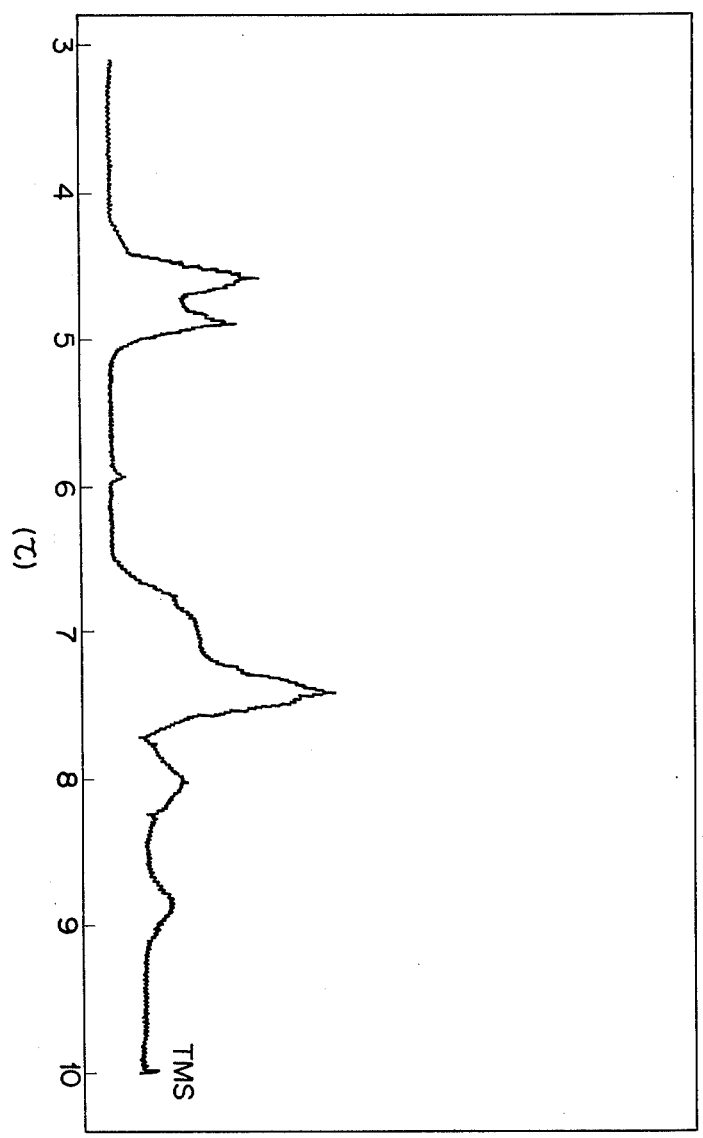

POLYMERS OF ACID ANHYDRIDE TYPE NORBORNENE DERIVATIVES AND A METHOD OF PREPARING THE SAME

This invention relates to novel polymers prepared with various prominent properties by ring-opening polymerization of norbornene derivatives having at least one carboxylic anhydride group and a method of preparing the same. An article by R. E. Rinechart appearing in the Journal of Polymer Science (1969) Part C, No. 27, pages 7 to 25 and the Japanese Patent Publications Nos. 22705/67 and 7552/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveney appearing in the Journal of Polymer Science (1965), Part A, vol. 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyanobicyclo[2,2,1]-heptene-2 can not provide a polymer even when subjected to ring-opening polymerization, using a catalyst of compounds of ruthenium, osmium or iridium. As seen from the foregoing description, some of the derivatives of cycloolefins, particularly those of norbornene can be made into polymers by ring-opening polymerization, using a certain kind of a catalytic system, whereas the others of said norbornene derivatives can not be expected to admit of ring-opening polymerization even when the same kind of catalytic system is used.

The present inventors have conducted studies on the ring-opening polymerization of cyano- and ester-substituted norbornene derivatives. As the result, it has been found that polymers can be prepared by ring-opening polymerization of the above-mentioned norbornene derivatives, using a catalytic system consisting of compounds of tungsten and/or those of molybdenum and organic aluminium compounds. It has also been disclosed that said polymer can not be produced by ring-opening polymerization of cyano- or ester-substituted norbornene derivatives, using a catalytic system consisting of compounds of titanium and/or those of vanadium and organic aluminium compounds. (Japanese Patent Application Disclosure Nos. 100500/73, 67999/74 and 77999/74).

It is an object of this invention to provide novel polymers prepared with a reduced viscosity of 0.1 to 20 (as measured at 30° C in a 1% by weight of aqueous solution of sodium carbonate with the concentration of the polymers fixed at 0.2g/dl) by ring-opening polymerization of acid anhydride type norbornene derivatives having at least one carboxylic anhydride group.

Another object of the invention is to provide a method of carrying out the ring-opening polymerization of acid anhydride type norbornene derivatives having at least one carboxylic anhydride group in the presence of a catalytic system consisting of organic aluminium compounds and at least one compound selected from the group consisting of compounds of tungsten and those of molybdenum. The ring-opening polymerization of said norbornene derivatives can also be effected in the presence of a catalytic system prepared by mixing the above-mentioned catalytic system with at least one compound selected from the group consisting of water, peroxides, epoxides, organic halides, acetal compounds, orthoformic acid esters, orthocarboxylic acid esters, alcoholic compounds and phenolic compounds. Ring-opening polymerization by the above-mentioned process of a mixture of norbornene derivatives having at least one carboxylic anhydride group and other cycloolefins provides copolymers of these components.

The polymers and copolymers of this invention obtained by the above-mentioned method are prominent not only in resistance to solvents but also in softening point, tensile strength and hardness.

The accompanying drawing shows the nuclear magnetic resonance spectrum of the polymers of this invention obtained in Example 12.

The present inventors have elaborated to find new polymers which can be obtained by ring-opening polymerization of norbornene derivatives having at least one carboxylic anhydride group in the presence of a catalytic system consisting of a mixture of organic aluminium compounds and compounds of tungsten and/or those of molybdenum or a catalytic system consisting of said mixture to which there is added at least one compound (hereinafter referred to as "a third component") selected from the group consisting of water, peroxides, epoxides, organic halides, acetal compounds, orthoformic acid esters, orthocarboxylic acid esters, alcoholic compounds and phenolic compounds.

Polymers obtained by the above-mentioned ring-opening polymerization of norbornene derivatives having an acid anhydride group are of an entirely novel type. The French Pat. No. 1,594,934 shows that there can be obtained the ring-opening polymerization product of imide type compounds expressed by the general formula

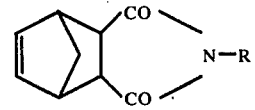

where R is a hydrogen atom, alkyl radical, cycloalkyl radical or aryl radical. However, the norbornene derivatives having an acid anhydride group used as a monomer in this invention are different from the above-mentioned imide type compounds. According to said French Pat. No. 1,594,934, ring-opening polymerization is carried out in a protic solvent such as methyl alcohol, using a catalyst of noble metal halides such as $RuCl_3 3H_2O$. Accordingly, the polymerization method set forth in said French Pat. No. 1,594,934 is quite different from that of this invention.

Norbornene derivatives having at least one carboxylic anhydride group (hereinafter referred to as "acid anhydride type norbornene derivatives") used in this invention can be prepared by the Diels-Alder reaction between cyclopentadiene or dicyclopentadiene and unsaturated compounds having carboxylic anhydride group (refer to "Organic Reactions" by H. L. Holmes, Vol. 4, p.p. 60 to 173, 1948, published by John Wiley and Sons, Inc.). With the acid anhydride type norbornene derivatives, the substituent may take the endo or exo position. These endo and exo isomers, can be separated by precision distillation or repeated recrystallization. For the object of this invention, however, these two types of isomers may be used in a separated or nonseparated state. Further, the acid anhydride type norbornene derivatives may be used alone or in combination of two or more type of said norbornene derivatives.

Any unsaturated compounds containing carboxylic anhydride group are available for the above-mentioned reaction. The typical unsaturated compounds containing carboxylic anhydride group include noncyclic unsaturated acid anhydride such as maleic anhydride, itaconic anhydride, citraconic anhydride and α-methyl glutaconic anhydride and cyclic acid anhydride such as those obtained by the Diels-Alder addition reaction between said noncyclic unsaturated acid anhydrides and diene compounds such as butadiene, isoprene, 1,3-pentadiene and cyclopentadiene. The cyclic acid anhydrides include 4,5-cyclohexene-dicarboxylic anhydride, 1-methyl-4,5-cyclohexenedicarboxylic anhydride, 3,6-methylene-1,2,3,6-tetrahydro-cis-phthalic anhydride, (4-carboxy-4-cyclohexenyl) acetic anhydride (A), 4-methyl-4,5-cyclohexene dicarboxylic anhydride (B) and (4-carboxy-5-cyclohexenyl) acetic anhydride (C). The aromatic acid anhydrides include 4-vinyl phthalic anhydride. The above-mentioned compounds (A), (B) and (C) may be expressed by the following general formulas respectively.

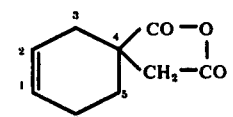
(A)

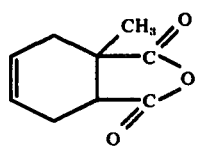
(B)

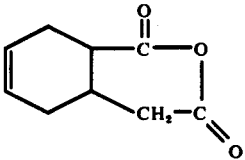
(C)

From the above-mentioned unsaturated acid anhydrides and cyclopentadiene or dicyclopentadiene are obtained acid anhydride type norbornene derivatives such as 3,6-methylene-1,2,3,6-tetrahydro-cis-phthalic anhydride (I), 6-(5-carboxy-bicyclo[2,2,1]-hepta-2-enyl) acetic anhydride (II), 3,6-methano-1-methyl-1,2,3,6-tetrahydro-cis-phthalic anhydride (III), 2-oxa-1,4-dioxo-5,8methano-1,2,3,4,4a,5,8,8a-octahydronaphthalene (IV), 5,8-methano-1,2,3,4,4a,5,8,8a-octahydronaphthalene-1,2-dicarboxylic anhydride (V), 5,8-methano-1-methyl-1,2,3,4,4a,5,8,8a-octahydronaphthalene-2,3-dicarboxylic anhydride (VI), 1,4,5,8-dimethano-1,2,3,4,4a, 5,8,8a-octahydronaphthalene-2,3-dicarboxylic anhydride (VII), 2-oxa-1,3-dioxo-1,2,3,4,4a,5,8,8a,9,9a,10,10a dodecahydroanthracene (VIII), and 4-(5-bicyclo[2,2,1]-hepta-2-enyl) phthalic anhydride (IX). These nine kinds of acid anhydride, type norbornene derivatives may be indicated by the following formulas:

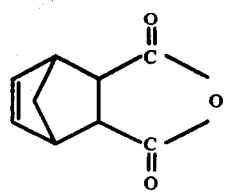
(I)

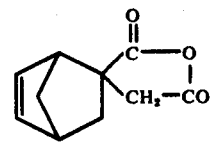
(II)

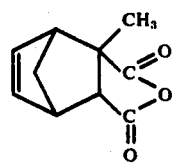
(III)

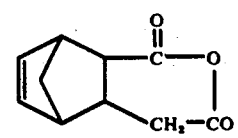
(IV)

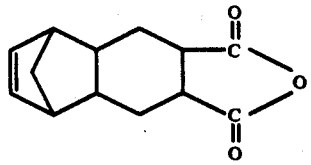
(V)

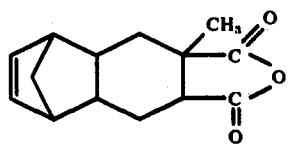
(VI)

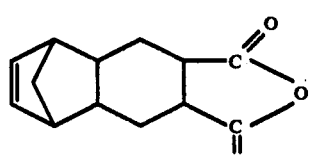
(VII)

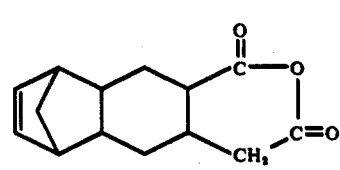
(VIII)

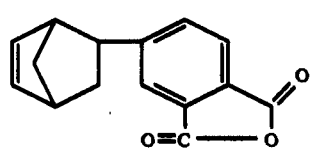
(IX)

The polymers of this invention can be prepared by ring-opening polymerization of the various acid anhydride type norbornene derivatives obtained by the above-mentioned process in the presence or absence of an inert organic solvent using a catalytic system consisting of a mixture of organic aluminium compounds and compounds of tungsten and/or those of molybdenum or a catalytic system consisting of said mixture to which there is added at least one compound selected from the group consisting of water, peroxides, epoxides, organic halides, acetal compounds, alcoholic compounds, phenolic compounds, orthoformic acid esters and orthocarboxylic acid esters.

The ring-opening polymerization is effected through the following process:

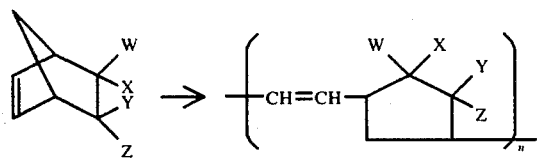

where: W,X,Y and Z denote are radicals selected from the group consisting of carboxylic anhydride group and substituent containing carboxylic anhydride group.

The polymers obtained present different properties from various factors, namely according as the double bond of the polymer is of the cis or trans type, or depending on the mutual substitution positions and steric positions of the substituents.

Acid anhydride type norbornene derivatives are sometimes likely to polymerize through their c=c double bond according to the following scheme, that is, vinylene polymerization.

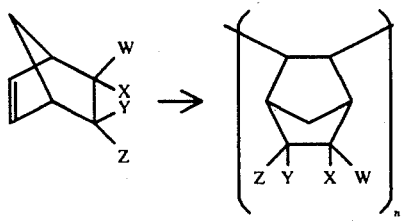

where: W, X, Y and Z denote the aforementioned radicals.

However, said vinyl polymerization produces polymer with chemical structure different from the polymers in this invention.

The polymers prepared by ring-opening polymerization of acid anhydride type norbornene derivatives include not only homopolymers of acid anhydride type norbornene derivatives obtained by the above-mentioned process but also copolymers prepared by the ring-opening polymerization of a mixture of the acid anhydride type norbornene derivatives as a main component and other cycloolefins which is carried out in the same manner as in producing the homopolymers of said acid anhydride type norbornene derivatives.

Other cycloolefins used as comonomers in producing the above-mentioned copolymers typically include monocyclic olefins such as cyclopentene, cycloheptene, cyclooctene and cyclododecene; nonconjugated cyclopolyenes such as 1,5-cyclooctadiene, 1,5,9-cyclododecatriene, 1-chloro, 1,5-cyclooctadiene and norbornadiene (bicyclo[2,2,1]-hepta-2,5-diene); cyano-substituted norbornene derivatives such as 5-cyano bicyclo [2,2,1]-heptene-2, 5-cyano-5-methyl bicyclo [2,2,1]-heptene-2, 5-cyano-5-cyano-n-octyl bicyclo[2,2,1]-heptene-2, 5,5-dicyano bicyclo[2,2,1]-heptene-2, 5,6-dicyano bicyclo[2,2,1]-heptene-2, 5-cyano-6-phenyl bicyclo[2,2,1]-heptene-2, 5-n-2-octenyl 6-ω-cyano-n-heptyl, bicyclo[2,2,1]-heptene-2 and 5-n-pentyl, 6-ω-cyano-2-decenyl, bicyclo[2,2,1]-heptene-2; ester type norbornene derivatives such as 5-methoxy carbonyl-bicyclo[2,2,1]-heptene-2, 5-ethoxycarbonyl-bicyclo[2,2,1]-heptene-2, 5-butoxycarbonyl-bicyclo[2,2,1]-heptene-2, 5-allyloxycarbonyl-bicyclo[2,2,1]-heptene-2, 5-methyl-5-methoxycarbonyl-bicyclo[2,2,1]-heptene-2, 5-hexyloxycarbonyl-6-methyl-bicyclo[2,2,1]-heptene-2, 5-ethoxycarbonyl-6-phenyl-bicyclo [2,2,1]-heptene-2, 5-heptyl-6-octyloxycarbonyl-bicyclo[2,2,1]-heptene-2, 5-methoxycarbonyl-6-methoxycarbonyl methyl-bicyclo [2,2,1]-heptene-2, 5,6-dimethoxycarbonylbicyclo[2,2,1]-heptene-2, 5,6-diethoxycarbonyl-bicyclo[2,2,1]-heptene-2, 5,5-dibutoxycarbonyl-bicyclo[2,2,1]-heptene-2, 5-methyl-6,6-dimethoxycarbonyl-bicyclo[2,2,1]-heptene-2, 5-ω-methoxycarbonylheptyl-6-octyl-bicyclo[2,2,1]-heptene-2, 5-ω-methoxycarbonyl-2-decenyl-6-pentyl-bicyclo[2,2,1]-heptene-2, 5-ω-methoxycarbonyl heptyl-6-2-octenyl-bicyclo[2,2,1]-heptene-2, 5-acetoxymethyl-bicyclo [2,2,1]-heptene-2, 5-acetoxy-bicyclo[2,2,1]-heptene-2, 5-propionoxymethyl-bicyclo[2,2,1]-heptene-2, and 5-stearoxymethyl-bicyclo[2,2,1]-heptene-2; ether type norbornene derivatives such as 5-methoxybicyclo [2,2,1]-heptene-2, 5-ethoxy-bicyclo [2,2,1]-heptene-2, 5-n-propoxy-bicyclo[2,2,1]heptene-2, 5-isopropoxy-bicyclo[2,2,1]-heptene-2, 5-n-butoxy-bicyclo[2,2,1]-heptene-2, 5-cyclohexoxy-bicyclo[2,2,1]-heptene-2, 5-cyclohexoxy-bicyclo [2,2,1]-heptene-2, 5-methoxymethyl-bicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2; imide type norbornene derivatives, for example, N-substituted-3,6-methylene-1,2,3,6-tetrahydro-cis-phthalimides (the N-substituent is selected from the group consisting of alkyl radical, alkenyl radical, cycloalkyl radical, aryl radical and ester group) such as N-methyl-3,6-methylene-1,2,3,6-tetrahydro-cis-phthalimide, N-n-butyl-3,6-methylene-1,2,3,6-tetrahydro-cis-phthalimide, N-octyl-3,6-methylene-1,2,3,6-tetrahydro-cis-phthalimide, N-decyl-3,6-methylene-1,2,3,6-tetrahydro-cis-phthalimide, N-dodecyl-3,6-methylene-1,2,3,6-tetrahydro-cis-phthalimide, N-allyl-3,6-methylene-1,2,3,6-tetrahydro-cis N-cyclohexyl-3,6-methylene-1,2,3,6-tetrahydro-cis-phthalimide, N-(4-methyl cyclohexyl)-3,6-methylene-1,2,3,6-tetrahydro-cis-phthalimide, N-phenyl-3,6-methylene-1,2,3,6-tetrahydro-cis-phthalimide, and N-tolyl-3,6-methylene-1,2,3,6-tetrahydro-cis-phthalimide, N-acetoxymethyl-3,6-methylene-1,2,3,6-tetrahydro-cis-phthalimide, N-phenoxy-carbonylmethyl-3,6-methylene-1,2,3,6-tetrahydro-cis-phthalimide, N-ω-ethoxycarbonyl-n-butyl-3,6-methylene-1,2,3,6-tetrahydro-cis-phthalimide, and N-1-cyclohexyloxycarbonyl-n-pentyl-3,6-methylene-1,2,3,6-tetrahydro-cis-phthalimide, N-substituted 3,6-methylene-1-methyl-1,2,3,6-tetrahydro-cis-phthalimides (said N-substitution being made in the same manner as in the above-mentioned N-substituted 3,6-methylene-1,2,3,6-tetrahydro-cis-phthalimides), N-substituted bicyclo [2,2,1]-hepta-2-ene-5-spiro-3'-sucoinimides (said N-substitution being made in the same manner as in the abovementioned N-substituted 3,6-methylene-1,2,3,6-tetrahydro-cis-phthalimides), N-substituted 2-aza-1,3-dioxo-5,8-methano-1,2,3,4,4a,5,8,8a-octahydronaphthalenes (said N-substitution being made in the same manner as in the above-mentioned N-substituted 3,6-methylene-1,2,3,6- tetrahydro-cis-phthalimides), N-substituted 5,8-methano-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 5,8-methano-2-methyl-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4-methano-1,4,4a,5,6,7,8,8a-octahydronaphthalene-6-spiro-3′-succinimides (said N-substitution being made in the same manner as in the above-mentioned N-substituted 3,6-methylene-1,2,3,6-tetrahydro-cis-phthalimides), N-substituted 2-aza-1,3-dioxo-5,8-methano-1,2,3,4,4a,5,8,8a,9,9a,10,10a-dodecahydroanthracenes (said N-substitution being made in the same manner as in the above-mentioned N-substituted 3,6-methylene-1,2,3,6-tetrahydro-cis-phthalimides), N-substituted 1,4,5,8-dimethano-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4,5,8-dimethano-2-methyl-1,2,3,4,4a,5,8,8a-octahydronaphthalene-2,3-dicarboxyimides (said N-substitution being made in the same manner as in the above-mentioned N-substituted 3,6-methylene-1,2,3,6-tetrahydro-cis-phthalimides), N-substituted 1,4,5,8-dimethano-1,4,4a,5,6,7,8,8a-octahydronaphthalene-6-spiro-3′-succinimides (said N-substitution being made in the same manner as in the above-mentioned N-substituted 3,6-methylene-1,2,3,6-tetrahydro-cis-phthalimides), N-substituted 2-aza-5,8,9,10-dimethano-1,3-dioxo-1,2,3,4,4a,5,8,8a,9,10,10a-dodecahydroanthracenes (said N-substitution being made in the same manner as in the above-mentioned N-substituted 3,6-methylene-1,2,3,6-tetrahydro-cis-phthalimides), and N-substituted 4-(5-bicyclo[2,2,1]-hepta-2-enyl) phthalimides (said N-substitution being made in the same manner as in the above-mentioned N-substituted 3,6-methylene-1,2,3,6-tetrahydro-cis-phthalimides); N-ω-(5-norborna-2-enyl) alkyl-substituted maleimides such as N-(5-norborna-2-enyl) methyl-maleimide, N-[4-(5-norborna-2-enyl) butyl] maleimide, N-[8-(5-norborna-2-enyl)octyl] maleimide, N-[10-(5-norborna-2-enyl)decyl] maleimide, N-[12-(5-norborna-2-enyl)-dodecyl] maleimide, N-[4-(6-methyl-5-norborna-2-enyl)butyl] maleimide, N-(10-(6-methyl-5-norborna-2-enyl)decyl] maleimide, N-(6-ethyl-5-norborna-2-enyl) methylmaleimide, N-[4-(6-ethyl-5-norborna-2-enyl)butyl] maleimide, N-[8-(6-ethyl-5-norborna-2-enyl)octyl]maleimide, N-[12-(6-ethyl-5-norborna-2-enyl) dodecyl]maleimide, N-[11-(6-propyl5-norborna-2-enyl)undecyl] maleimide, N-[2-(6-dodecyl-5-norborna-2-enyl)ethyl] maleimide, and N-[4-(6-dodecyl-5-norborna-2-enyl)butyl]maleimide (in the above-listed N-ω-(5-norborna-2-enyl)alkyl substituted maleimides, the position of 6 of norbornene is substituted by a hydrogen atom or alkyl radical and the number of methylene radicals connecting the imide ring with the norbornene ring is 1 to 20), citraconimides wherein the position of 6 of norbornene is substituted by a hydrogen atom or alky radical and the number of methylene radicals connecting the imide ring with the norbornene ring is 1 to 20 as in the above-mentioned N-ω-(5-norborna-2-enyl) alkyl substituted maleimides, glutaconimides having the same particular chemical structure as noted above in parentheses, succinimides having the same particular chemical structure as noted above in parentheses, phthalimides having the same particular chemical structure as noted above in parentheses, naphthalene-1,8-dicarboxyimides having the same particular chemical structure as noted above in parentheses, and naphthalene-2,3-dicarboxyimides having the same particular chemical structure as noted above in parentheses; amide type norbornene deriatives such as N,N-dimethyl-bicyclo[2,2,1]-heptene-2-carbonamide-5, N-methyl-N-ethyl-bicyclo[2,2,1]-heptene-2-carbonamide-5, N,N-di-n-propyl-bicyclo[2,2,1]-heptene-2-carbonamide-5, N,N-dicyclohexyl-bicyclo[2,2,1]-heptene-2-carbonamide-5, N,N-diphenyl-bicyclo [2,2,1]-heptene-2-carbonamide-5, N,N-dibenzyl-bicyclo[2,2,1]-heptene-2-carbonamide-5, N,N-dimethyl-5-methyl-bicyclo[2,2,1]-heptene-2-carbonamide-5, N,N-diethyl-6-methyl-bicyclo[2,2,1]-heptene-2-carbonamide-5 and N,N,N′,N′-tetramethyl-bicyclo[2,2,1]-heptene-2-carbonamide-5; aromatic norbornene derivatives such as 5-phenyl-bicyclo[2,2,1]-heptene-2, 5-methyl-5-phenyl-bicyclo[2,2,1]-heptene-2, 5-ethyl-5-phenyl-bicyclo[2,2,1]-heptene-2, 5-(p-tolyl)-bicyclo[2,2,1]-heptene-2, 5-(p-t-butyl-phenyl)-bicyclo[2,2,1]-heptene-2, 5-α-naphthyl-bicyclo[2,2,1]-heptene-2, and 5-α-anthryl-bicyclo[2,2,1]-heptene-2; aromatic dimethano-octahydronaphthalene derivatives such as 2-phenyl-1,4; 5,8-dimethano-1,2,3,4,4a,5,8,8a-octahydronaphthalene, 2-methyl-2-phenyl-1,4; 5,8-dimethano-1,2,3,4,4a,5,8,8a-octahydronaphthalene, 2-ethyl-2-phenyl-1,4; 5,8-dimethano-1,2,3,4,4a,5,8,8a-octahydronaphthalene, 2-(p-tolyl)-1,4; 5,8-dimethano-1,2,3,4,4a,5,8,8a-octahydronaphthalene, 2-(p-t-butylphenyl)-1,4; 5,8-dimethano-1,2,3,4,4a,5,8,8a-octahydronaphthalene, 2-α-naphthyl-1,4; 5,8-dimethano-1,2,3,4,4a,5,8,8a-octa-hydronaphthalene, and 2-α-anthryl-1,4; 5,8-dimethano-1,2,3,4,4a,5,8,8a-octahydronaphthalene; aromatic norbornadiene derivatives such as 1,4-dihydro-1,4-methanonaphthalene, 1,4-dihydro-1,4-methano-6-methylnaphthalene, 1,4-dihydro-1,4-methano-6-methoxynaphthalene, 1,4dihydro-1,4methano-6-methoxycarbonyl naphthalene, 1,4-dihydro-6-fluoro-1,4-methanonaphthalene, 1,4-dihydro-1,4-methano-6-trifluoromethyl naphthalene, 1,4-dihydro-1,4-methano-5,6,7,8-tetrafluoronaphthalene, 6-chloro-1,4-dihydro-1,4-methanonaphthalene, 1,4-dihydro-1,4-methano-5,6,7,8-tetrachloronaphthalene, 5,8-diacetoxy-1,4-dihydroxy-1,4-methanonaphthalene, 5,8-diacetoxy-6,7-dicyano-1,4-dihydro-1,4-methanonaphthalene, 5,8-diacetoxy-1,4-dihydro-1,4-methano-6-methyl naphthalene, 5,8-diacetoxy-1,4-dihydro-6,7-dimethyl-1,4-methanonaphthalene, 5,8-diacetoxy-1,4-dihydro-6-fluoro-1,4-methanonaphthalene, 5,8-diacetoxy-1,4-dihydro-1,4-methano-6-methoxynaphthalene, 5,8-diacetoxy-1,4-dihydro-6,7-dimethoxy-1,4-methano naphthalene, 6-cyano-1,4-dihydro-1,4-methanonaphthalene, 1,4-dihydro-1,4-methanoanthracene, 1,4-dihydro-1,4-methano-5-methylanthracene, 1,4-dihydro-1,4-methano-6-methoxycarbonyl anthracene, 9,10-diacetoxy-1,4-dihydro-1,4-methanoanthracene, 6-cyano-1,4-dihydro-1,4-methanoanthracene, and 1,4-dihydro-9,10-diphenyl-1,4-methanoanthracene; ester type norbornadiene derivatives such as 2-methoxycarbonyl-bicyclo[2,2,1]-hepta-2,5-diene, 2-ethoxycarbonyl-bicyclo[2,2,1]-hepta-2,5-diene, 2-n-propyloxycarbonyl-bicyclo [2,2,1]-hepta-2,5-diene, 2-isopropyloxycarbonyl-bicyclo[2,2,1]-hepta-2,5-diene, 2-butyloxycarbonyl-bicyclo[2,2,1]-hepta-2,5-diene, 2-pentyloxycarbonyl-bicyclo[2,2,1]-hepta-2,5-diene, 2-hexyloxycarbonylbicyclo[2,2,1]-hepta-2,5-diene, 2-octyloxycarbonyl-bicyclo[2,2,1]-hepta-2,5-diene, 2-decyloxycarbonylbicyclo[2,2,1]-hepta-2,5-diene, 2-methoxycarbonyl-bicyclo [2,2,1]-hepta-2,5-diene, 2-methoxycarbonyl-3-ethyl-bicyclo [2,2,1]-hepta-2,5-diene, 2,3-dimethoxycarbonyl-bicyclo[2,2,1]-hepta-2,5-diene, 2-methoxycarbonyl-3-ethoxycarbonyl-bicyclo [2,2,1]-hepta-2,5-diene, 2,3-diethoxycarbonyl-bicyclo[2,2,1]-hepta-2,5-diene, 2,3-dipropyloxycarbonyl-bicyclo[2,2,1]-hepta-2,5-diene, 2,3-dibutyloxycarbonyl-bicyclo[2,2,1]-hepta-2,5-diene, 2-methoxycarbonyl-3-butylcarbonyl-bicyclo[2,2,1]-hepta-2,5-diene, 2,3-dipentyloxycarbonyl-bicyclo[2,2,1]-hepta-2,5-diene, 2,3-dihexyloxycarbonyl-bicyclo[2,2,1]-hepta-2,5-diene, 2-methoxycarbonyl-3-hexyloxycarbonyl-bicyclo[2,2,1]-hepta-2,5-diene, 2-acetoxymethyl-bicyclo [2,2,1]-hepta-2,5-diene, 2-propionyloxymethyl-bicyclo[2,2,1]-hepta-2,5-diene, 2-butyryloxymethyl-bicyclo[2,2,1]-hepta-2,5-diene, 2-valeryloxymethyl-bicyclo[2,2,1]-hepta-2,5-diene, 2-capryloxy-bicyclo[2,2,1]-hepta-2,5-diene, 2-capryloxymethyl-bicyclo[2,2,1]-hepta-2,5-diene, 2,3-di(acetoxymethyl)-bicyclo[2,2,1]-hepta-2,5-diene, 2,3-di(propionyloxymethyl)-bicyclo[2,2,1]-hepta-2,5-diene, 2,3-di(butyryloxymethyl)-bicyclo[2,2,1]-hepta-2,5-diene, 2-methoxycarbonylmethyl-bicyclo[2,2,1]-hepta-2,5diene, 2-ethoxycarbonylmethylbicyclo[2,2,1]-hepta-2,5-diene, 2-propyloxycarbonylmethyl-bicyclo[2,2,1]-hepta-2,5-diene, 2-methoxycarbonyl-3-propyl-bicyclo[2,2,1]-hepta-2,5-diene, 2-methoxycarbonyl-3-hexyl-bicyclo[2,2,1]-hepta-2,5-diene, 2-methoxycarbonyl-3-cyclohexyl-bicyclo[2,2,1]-hepta-2,5-diene, 2-methoxycarbonyl-3-phenyl-bicyclo[2,2,1]-hepta-2,5-diene, 2-acetoxymethyl-3-methyl-bicyclo[2,2,1]-hepta-2,5-diene, 2-acetoxymethyl-3-ethyl-bicyclo[2,2,1]-hepta-2,5-diene, 2-acetoxymethyl-3-phenyl-bicyclo[2,2,1]-hepta-2,5-diene,2-propionyloxymethyl-3-methyl-bicyclo[2,2,1]-hepta-2,5-diene, and 2-valeryl-oxymethyl-3-phenyl-bicyclo[2,2,1]-hepta-2,5-diene; bicyclo [2,2,1]-heptene-2(norbornene); and 5-methyl-bicyclo[2,2,1]-heptene-2.

Organic aluminium compounds constituting a part of the catalytic system used in the ring-opening polymerization are of the type whose chemical structure may be expressed by the general formula $AlR_3$ or $AlR_nX_{3-n}$ (where R represents the alkyl or aryl radical, X denotes halogens, hydrogen or alkoxy radical and n is 1, 1.5 or 2) or $AlR_3$–$H_2O$ (where the mol ratio of $H_2O$ to $AlR_3$ has a value of <1.5).

Compounds represented by $AlR_3$, i.e., trialkyl aluminiums include trimethyl aluminium, triethyl aluminium, tri-n-propyl aluminium, triisopropyl aluminium, triisobutyl aluminium, trihexyl aluminium and trioctyl aluminium, and triaryl aluminium such as tribenzyl aluminium and triphenyl aluminium.

Compounds denoted by $AlR_2X$ include aluminium monohalides such as diethyl aluminium monochloride, di-n-propyl aluminium monochloride, di-isobutyl aluminium monochloride, di-n-butyl aluminium monochloride, diethyl aluminium monobromide, and diethyl aluminium monoiodide; dialkyl aluminium monohydrides such as diethyl aluminium monohydride, di-n-propyl aluminium monohydride, and di-isobutyl aluminium monohyride; diaryl aluminium monohalides such as dibenzyl aluminium monochloride, diphenyl aluminium monochloride, dibenzyl aluminium monobromide, and ditolyl aluminium monochloride; and dialkyl aluminium monoalkoxides such as diethyl aluminium monoethoxide, and diisobutyl aluminium monobutoxide.

Compounds indicated by $AlR_{1.5}X_{1.5}$ include ethyl aluminium sesquichloride, ethyl aluminium sesquibromide, and isobutyl aluminium sesquichloride.

Compounds represented by $AlRX_2$ include alkyl aluminium dihalides such as ethyl aluminium dichloride, ethyl aluminium dibromide, propyl aluminium dichloride, isobutyl aluminium dichloride, ethyl aluminium dibromide, and ethyl aluminium diiodide; aryl aluminium dihalides such as benzyl aluminium dichloride, benzyl aluminium dibromide, tolyl aluminium dichloride, and phenyl aluminium dichloride; and alkyl aluminium dialkoxides such as ethyl aluminium diethoxide.

Mixtures denoted by $AlR_3$–$H_2O$ are mixtures of trialkyl aluminium and water in which the trialkyl aluminium accounts for at least 2 mols based on 3 mols of water. Such mixtures include, for example, mixture of triethyl aluminium and water in which said triethyl aluminium and water should be in the ratio of 1:0.5.

Most preferable among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the triethyl aluminium and water bear the mole ratio of 1:0.5.

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdenum such as tungsten oxytetrachloride, tungsten oxytetrabromide, tungsten oxydichloride, molybdenum oxytrichloride, and molybdenum oxytetrachloride, in addition, molybdenum dioxydiacetyl acetonate [$MoO_2(CH_3COCH=C(CH_3)O-)_2$, hereinafter referred to as $MoO_2(AcAc)_2$], tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and halides of aluminium-tungsten, for example, $Al_4W_3Cl_{18}$ obtained by reducing halides of tungsten by powders of aluminium. Most preferable among the above-listed compounds of tungsten and molybdenum are molybdenum pentachloride, tungsten hexachloride, tungsten oxytetrachloride ($WOCl_4$) and $Al_4W_3Cl_{18}$. The mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

While, in the ring-opening polymerization, the above-mentioned binary catalytic system consisting of organic aluminium compounds and compounds of tungsten or molybdenum can effect the ring-opening polymerization of acid anhydride type norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds, phenolic compounds, orthoformic acid esters, and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide; peracids such as peracetic acid; and esters, ketones and aldehydes derived from said peracids. The epoxides include ethylene oxide, propylene oxide, butene oxide, epichlorohydrin, allyl glycidyl ether, and butadiene monoxide. The organic halides include t-butyl hypohalite compounds; allyl halides such as allyl chloride; t-alkyl halides such as t-butyl chloride; halogenated ketones such as α-chloroacetone; and halogenated alcohols such as 2-chloroethanol. The acetal compounds include acetaldehyde dimethylacetal, acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol, isobutyl alcohol and ethylene chlorohydrin.

The phenolic compounds include phenol, p-methyl phenol, p,p'-isopropylidene diphenol, 2,6-dimethylphenol, p-chlorophenol, 1,3-benzenediol and 1,3,5-benzenetriol. The orthoformic acid esters include methyl orthoformate and ethyl orthoformate. The orthocarboxylic acid esters include ethyl orthoacetate, n-propyl orthopropionate and butyl orthophenylacetate. Preferable among the orthoformic acid esters and orthocarboxylic acid esters are alkyl orthoformate such as methyl orthoformate and ethyl orthoformate. Water is also an effective third component of the subject catalytic system. While the amount of the third component added varies with its type, its proportion is generally 0.1 to 6 mols, or preferably 0.3 to 3 mols based on 1 mol of compounds of tungsten or molybdenum.

While the amount of the subject catalytic system added to the monomer of acid anhydride type norbornene derivatives varies with the type of said monomer, etc. the compounds of tungsten or molybdenum should generally be added at the rate of 0.001 to 20 mols, or preferably 0.01 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the polymerization activity. Further, if unduly large amounts of said compounds of tungsten or molybdenum are used, the reaction system will contain such amounts of residual tungsten or molybdenum compounds as will be difficult to eliminate after completion of the ring-opening polymerization. The presence of said catalytic component in the polymer obtained will undesirably color the polymer. Said coloration increases the tint of the polymer in the subsequent operation of molding the polymer or causes the thermal deterioration of the resultant product.

As previously mentioned, the ring-opening polymerization of acid anhydride type norbornene derivatives can be carried out using the previously described catalytic system with or without an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenized hydrocarbons such as methylene chloride; 1,2-dichloroethane, 1,1-dichloroethne, 1,2-dichloropropane, chloroform, chlorobenzene; and ethers such as diethyl ether and tetrahydrofuran. The above-listed inert organic solvents may be used alone or in combination.

The catalytic components, monomer (acid anhydride type norbornene derivatives) and inert organic solvent (if used) may be added in various sequential orders. The typical sequence is to add first the inert organic solvent, secondly the monomer, thirdly the compounds of tungsten or molybdenum, fourthly the third component (if used), and finally organic aluminium compounds. It is also possible to mix the desired compounds among the catalytic components, monomer and solvent or heat them separately before they are used in the ring-opening polymerization.

The object of the ring-opening polymerization can be fully attained, as previously described, by the ring-opening polymerization of acid anhydride type norbornene derivatives in the presence of a catalytic system consisting of compounds of tungsten and/or those of molybdenum and organic aluminium compounds or a mixture of said both types of compounds and the aforesaid third component. Yet, the molecular weight of the resultant polymer can be controlled by adding to the polymerization system α-olefins such as ethylene, propylene, butene-1 and hexene-1; internal olefins such as butene-2 and hexene-2; conjugated diolefins such as butadiene and isoprene; or nonconjugated diolefins such as 1,4-hexadiene. In this case, it is generally recommended to add 0.01 to 10 parts by weight of said molecular weight controlling agent based on 100 parts by weight of the monomer of norbornene derivatives.

As previously mentioned, the polymer can be obtained by the ring-opening polymerization of the subject monomer in the presence of an inert organic solvent or in the absence of said solvent (bulk polymerization). If used, said inert organic solvent is generally preferred to be added at the ratio of 1 to 10 parts by volume based on 1 part volume of the monomer.

The ring-opening polymerization is carried out generally at a temperature ranging from −100° C to +200° C or preferably −40° C to +100° C. At a lower temperature than −100° C, the reaction system does not display desirable polymerization activity with the resultant extremely slow progress of polymerization. In such case, progress of the polymerization consumes a great deal of time, furthermore, sometimes causing a mixture of the inert organic solvent and monomer to be solidified. Conversely, a higher temperature than 200° C fails to provide a good quality of polymer prepared by ring-opening polymerization, and is practically undesirable.

The ring-opening polymerization is preferred to take place in an inert atmosphere such as, argon and nitrogen. If oxygen and moisture are present in the reaction system, then the catalytic components i.e., the organic aluminium compounds and the compounds of tungsten or molybdenum will be changed to obstruct the reproducibility of said polymerization.

Elimination of a catalyst residue and recovery of a polymer produced upon completion of the ring-opening polymerization should be effected by the customary process of said elimination and recovery applied in the solution polymerization of, for example, isoprene and butadiene. When a solution obtained by polymerization (a solution containing a polymer resulting from ring-opening polymerization, unreacted monomers and a catalyst) is poured in lower alcohol such as methyl alcohol and ethyl alcohol containing a small amount of hydrochloric acid, then the catalyst is removed and a polymer produced is precipitated. It is also effective for purification to pretreat the reaction system by a treating agent such as ethanol amine, methoxyethyl alcohol, acetyl acetone and ethyl acetoacetate.

Polymers of acid anhydride type norbornene derivatives of this invention prepared by the above-mentioned process are resins having a reduced viscosity of 0.1 to 20, and generally have prominent resistance to solvents. The reduced viscosity of the polymer is measured at 30° C in a 1% by weight of aqueous solution of sodium carbonate with the concentration of the polymer fixed at 0.2g/dl. A polymer of, for example, 3,6-methylene-1,2,3,6-tetrahydro-cis-phthalic anhydride is insoluble in pure water, diluted or concentrated hydrochloric acid, alcohols, chloroform, 1,2,-dichloroethane, O-dichlorobenzene, tetrachloroethane, pyridine, dioxane, tetrahydrofuran, acetonitrile and ethyl acetate, though somewhat soluble in hot dimethyl formamide. The above-mentioned phthalic anhydride polymer only slightly swells in dimethylsulfoxide, N-methyl pyrrolidone and acetone.

Table 1 below shows the properties of polymers of this invention obtained in Examples 12 and 28 in comparison with the prior art resins, for example, polyvinyl chloride and polypropylene, proving that the ring-opening polymerization products of the invention have prominent properties such as heat resistance, tensile strength and hardness.

Table 1

| Properties | Polymers of this invention | | Prior art Resins | |
|---|---|---|---|---|
| | Example 12 | Example 28 | Polyvinyl chloride[1] | Polypropylene[2] |
| tensile[1] strength (Kg/cm²) | 720 | 595 | 539 | 356 |
| elongation at break (%)[3] | 20 | 65 | 240 | 950 |
| Rockwell[4] hardness (R) | 125 | 123 | 115 | 92 |
| Vicat[5] softening point (° C) | 180 | 164 | 89 | 151 |
| Izod impact strength (Kg.cm/cm-notched)[6] | 2.2 | 4.9 | 3.2 | 1.7 |

Notes:
[1]Manufactured by Kureha Chemical Industry Co., Ltd. under the trade mark "Kureha S901".
Manufactured by Showa Yuka Co., Ltd. under the trade mark "Shoallomer".
[3]Measured by the method of ASTM D-638-58T
[4]Measured by the method of ASTM D-785-51
[5]Measured by the method of ASTM D-1525-58T
[6]Measured by the method of ASTM D-256-56

The polymer of this invention whose molecules bear reactive double bonds not only enables other monomers such as styrene, acrylonitrile and methyl methacrylate to be graft-copolymerized with said polymer, but also can be formed into a thermosetting resin by applying heat in the presence or absence of a cross-linking agent such as an organic peroxide in said polymer. Further, the polymer of this invention which has a nature to decompose itself upon exposure to sunlight can be used as the so-called photodegradation type.

While the polymer or copolymer of this invention prepared from acid anhydride type norbornene derivatives may be used alone, it can be applied in a form blended with synthetic resins such as polyvinyl chloride, acrylonitrile-butadienestyrene resin (ABS resin) and methyl methacrylate resin. Further depending on the applications, the polymer of this invention may be mixed with additives such as stabilizers against light (ultraviolet rays), heat, oxygen and ozone, flame retardants, plasticizers, reinforcing agents, fillers, coloring agents, antistatic agents and decomposition accelerators to display a more prominent effect.

The polymer or copolymer of this invention, whether alone, or in a form mixed with the above-listed resins or additives, can be molded into a variety of shaped articles by the compression molding, extrusion molding, injection molding, blow molding and casting which are generally applied in manufacturing resin products.

The polymers of this invention have the above-mentioned advantages and can be used in wide fields by being molded into various shapes, for example, as containers like bottles, film, packing material, mechanical parts and parts of electrical appliances. Further, the polymers of the invention are well adapted for use as a container of, for example, gasoline due to high resistance to oils.

This invention will be more fully understood by the examples which follow. Throughout the examples, reduced viscosity $\eta_{sp/c}$ was measured in 1% by weight of aqueous solution of sodium carbonate at 30° C (having a concentration of 0.2 g/dl).

EXAMPLE 1

Under nitrogen atmosphere, a dry flask was charged with 100 parts by weight of 3,6-methylene-1,2,3,6-tetrahydro-cisphthalic anhydride (the ratio of the endo isomer to the exo isomer is about 1:1), 300 parts by weight of 1,2-dichloroethane and 1 mol % of tungsten hexachloride based on the amount of the monomer. 3 mol % of diethyl aluminium chloride was also added based on the amount of the monomer at room temperature after the monomer was thermally dissolved. Ring-opening polymerization was carried out at 60° C for 15 hours. Upon completion of said polymerization, a reaction system became solid to which 1000 parts by weight of dimethyl formamide heated at 80° C containing 0.1% by weight of bis(2-hydroxy-3-t-butyl-5-methyl phenyl) methane as a stabilizer was added to dissolve the polymerized system. At this time, the system was found to contain insoluble portions. A desired polymer was precipitated by adding a large amount of methyl alcohol to the system. After filtered and thoroughly washed with methyl alcohol, the polymer was dried at 50° C at reduced pressure, providing greenish brown resin having a reduced viscosity of 0.18 with the conversion of 50.3%.

EXAMPLE 2

Ring-opening polymerization was effected in substantially the same manner as in Example 1, excepting that the tungsten hexachloride used as a catalyst in Example 1 was replaced by 1 mol % of molybdenum pentachloride based on the amount of the monomer. Upon completion of the ring-opening polymerization, the same aftertreatment was carried out as in Example 1, providing a faintly brown transparent polymer having a reduced viscosity of 0.20 with the conversion of 10.2%.

EXAMPLE 3

Ring-opening polymerization was carried out in substantially the same manner as in Example 1, excepting that the tungsten hexachloride used as a catalyst in Example 1 was replaced by 1 mol % of tungsten hexaphenolate [$W(OC_6H_5)_6$] based on the amount of the monomer. Upon completion of the polymerization reaction, the same aftertreatment was applied as in Example 1, providing a faintly brown transparent polymer having a reduced viscosity of 0.35 with the conversion of 21.2%.

EXAMPLE 4

Ring-opening polymerization was conducted in substantially the same manner as in Example 1, excepting that the tungsten hexachloride used as a catayst in Example 1 was replaced by 1 mol % of molybdenum dioxy diacetyl acetonate [$MoO_2(AcAc)_2)$]. Upon completion of the polymerization reaction, the same aftertreatment was carried out as in Example 1, providing a faintly brown transparent polymer having a reduced viscosity of 0.43 with the conversion of 20.8%.

EXAMPLE 5

Ring-opening polymerization was carried out in substantially the same manner as in Example 1, excepting that the tungsten hexachloride used as a catalyst in Example 1 was replaced by 1 mol % of $Al_4W_3Cl_{18}$ obtained by reducing tungsten hexachloride by powder of aluminium based on the amount of the monomer. Upon completion of the reaction, the same aftertreatment was effected as in Example 1, providing a faintly brown transparent polymer passing having a reduced viscosity of 0.31 with the conversion of 22.9%.

EXAMPLE 6

Ring-opening polymerization was effected in substantially the same manner as in Example 1, excepting that the diethyl aluminium chloride used as a catalyst in Example 1 was replaced by 3 mol % of triethyl aluminium based on the amount of the monomer. Upon completion of the polymerization reaction, the same aftertreatment was carried out as in Example 1, providing a faintly brown polymer having a reduced viscosity of 0.44 with the conversion of 23.3%.

EXAMPLE 7

Ring-opening polymerization was carried out in substantially the same manner as in Example 1, excepting that diethyl aluminium chloride used as a catayst in Example 1 was replaced by 3 mol % of a catalyst based on the amounts of the monomer which was prepared by denaturating 1.0 mol of triethyl aluminium by 0.5 mol of water. Upon completion of the reaction, the same aftertreatment was applied as in Example 1, providing a faintly brown transparent polymer having a reduced viscosity of 0.42 with the conversion of 30.5%.

EXAMPLE 8

Ring-opening polymerization was conducted in substantially the same manner as in Example 1, excepting that the diethyl aluminium chloride used as a catalyst in Example 1 was replaced by 3 mol % of diethyl aluminium hydride. Upon completion of the reaction, the same aftertreatment was carried out as in Example 1, providing a faintly brown transparent polymer having a reduced viscosity of 0.22 with the conversion of 10.6%.

EXAMPLE 9 ring-opening polymerization was undertaken in substantially the same manner as in Example 1, excepting that diethyl aluminium chloride used as a catalyst in Example 1 was replaced by 3 mol % of a catalyst prepared by denaturating 1 mol of triethyl aluminium by 1 mol of n-butyl alcohol. Upon completion of the reaction, the same aftertreatment was conducted as in Example 1, providing a faintly brown transparent polymer having a reduced viscosity of 0.36 with the conversion of 27.1%.

EXAMPLE 10

Ring-opening polymerization was effected in substantially the same manner as in Example 1, excepting that diethyl aluminium chloride used as a catalyst in Example 1 was replaced by ethyl aluminium dichloride. Upon completion of the reaction, the same aftertreatment was carried out as in Example 1, providing a faintly brown transparent polymer having a reduced viscosity of 0.38 with the conversion of 19.7%.

EXAMPLE 11

Ring-opening polymerization was undertaken in substantially the same manner as in Example 1, excepting that diethyl aluminium chloride used as a catalyst in Example 1 was replaced by ethyl aluminium sesquichloride. Upon completion of the reaction, the same aftertreatment was carried out as in Example 1, providing a faintly brown transparent polymer having a reduced viscosity of 0.39 with the conversion of 13.6%.

EXAMPLE 12

Ring-opening polymerization was conducted in substantially the same manner as in Example 1, excepting that the proportions of the tungsten hexachloride and diethyl aluminium chloride used as catalysts in Example 1 were changed to 0.5 mol % and 1.5 mol % respectively based on the amounts of the monomer and 3 mol of acetaldehyde dimethyl acetal was added as a third component based on 1 mol of the tungsten hexachloride. Upon completion of the reaction, the same aftertreatment was carried out as in Example 1, providing a faintly brown transparent polymer having a reduced viscosity of 0.53 with the conversion of 96.0%. The polymer was partly insoluble in dimethyl formamide at 80° C.

Nuclear magnetic resonance analysis of this polymer was made in $NaOD-D_2O$, the resultant nuclear magnetic resonance spectrum being set forth in the accompanying drawing. This spectrum resembles that of a polymer obtained by the ringopening polymerization of norbornene and can be divided into two sections (refer to "Journal of Polymer Science" by Francis W. Michelotti and William P. Keaveney, Part A, Vol. III, p.900, 1965). Namely, the two sections are represented by $\tau=9.3$ to 6.5 (A) and $\tau=5.3$ to 4.2 (B). The former denotes proton attached to saturated carbon and the latter represents olefine proton. As previously mentioned, polymerization of norbornene derivatives may produce two type of polymer, i.e., the ring-opening type and vinylene type. The ratio of the area of the section B to the area of the section A is 2/6 for the ring-opening type and 0/8 for the vinylene type. As calculated from the accompanying drawing, the ratio of the area of B to the area of A is 2.0/6.1, proving that the spectrum of the accompanying drawing indicates a 100% ringopening type within the range of experimental errors.

The polymer obtained in Example 12 was substantially insoluble in solvents such as methyl alcohol, ethyl alcohol, methylene chloride, 1,2-dichloroethane, tetrahydrofuran, dioxane, benzene, toluene, and hexane while any of these solvents remained at a lower temperature than 80° C. However, the polymer swelled in acetone, N-methyl pyrrolidone and dimethyl sulfoxide, and was dissolved in hot dimethylformamide at 80° C.

The polymer obtained by the above-mentioned process could be formed into a sheet by hot pressing for 3 minutes on a hot press at a temperature of 280° C and a pressure of 50 Kg/cm$^2$. Determination was made of the physical properties of the sheet, the results being set forth in Table 1.

EXAMPLE 13

Ring-opening polymerization was carried out in substantially the same manner as in Example 12, excepting that the acetaldehyde dimethyl acetal used as a third component in Example 12 was replaced by one mol of t-butyl peroxide based on 1 mol of the tungsten hexachloride. Upon completion of the reaction, the same aftertreatment was carried out as in Example 12, providing a faintly brown transparent polymer having a reduced viscosity of 0.81 with the conversion of 84.6%.

EXAMPLE 14

Ring-opening polymerization was undertaken in substantially the same manner as in Example 12, excepting that the acetaldehyde dimethyl acetal used as a third component in Example 12 was replaced by one mol of t-butyl chloride based on 1 mol of the tungsten hexachloride. Upon completion of the reaction, the same aftertreatment was applied as in Example 12, providing a faintly brown transparent polymer having a reduced viscosity of 0.66 with the conversion of 73.5%.

EXAMPLE 15

Ring-opening polymerization was conducted in substantially the same manner as in Example 12, excepting that the acetaldehyde dimethyl acetal used as a third component in Example 12 was replaced by 2 mols of ethylene chlorohydrin based on 1 mol of the tungsten hexachloride. Upon completion of the reaction, the same aftertreatment as in Example 12 was carried out, providing a faintly brown transparent polymer having a reduced viscosity of 0.91 with the conversion of 91.1%.

EXAMPLE 16

Ring-opening polymerization was effected in substantially the same manner as in Example 12, excepting that the acetaldehyde dimethyl acetal used as a third component in Example 12 was replaced by 2 mols of α-chloroacetone based on 1 mol of the tungsten hexachloride. Upon completion of the reaction, the same aftertreatment was applied as in Example 12, providing a faintly brown transparent polymer having a reduced viscosity of 0.53 with the conversion of 90.3%.

EXAMPLE 17

Ring-opening polymerization was undertaken in substantially the same manner as in Example 12, excepting that the acetaldehyde dimethyl acetal used as a third component in Example 12 was replaced by 2 mols of benzoyl peroxide based on 1 mol of the tungsten hexachloride. Upon completion of the reaction, the same aftertreatment was effected as in Example 12, providing a faintly brown transparent polymer having a reduced viscosity of 0.42 with the conversion of 73.8%.

EXAMPLE 18

Ring-opening polymerization was conducted in substantially the same manner as in Example 12, excepting that the acetaldehyde dimethyl acetal used as a third component in Example 12 was replaced by 1.5 mols of ethyl orthoformate based on 1 mol of the tungsten hexachloride. Upon completion of the reaction, the same aftertreatment was applied as in Example 12, providing a faintly brown transparent polymer having a reduced viscosity of 0.77 with the conversion of 64.4%.

EXAMPLE 19

Ring-opening polymerization was conducted in substantially the same manner as in Example 12, excepting that the acetaldehyde dimethyl acetal used as a third component in Example 12 was replaced by 2 mols of propylene oxide based on 1 mol of the tungsten hexachloride. Upon completion of the reaction, the same aftertreatment was applied as in Example 12, providing a faintly brown transparent polymer having a reduced viscosity of 1.35 with the conversion of 92.5%.

EXAMPLE 20

Ring-opening polymerization was undertaken in substantially the same manner as in Example 12, excepting that the acetaldehyde dimethyl acetal used as a third component in Example 12 was replaced by 1 mol of n-butyl alcohol based on 1 mol of the tungsten hexachloride. Upon completion of the reaction, the same aftertreatment was carried out as in Example 12, providing a faintly brown transparent polymer having a reduced viscosity of 1.21 with the conversion of 88.2%.

EXAMPLE 21

Ring-opening polymerization was effected in substantially the same manner as in Example 12, excepting that the acetaldehyde dimethyl acetal used as a third component in Example 12 was replaced by 1 mol of water based on the tungsten hexachloride. Upon completion of the reaction, the same aftertreatment was applied as in Example 12, providing a faintly brown transparent polymer having a reduced viscosity of 0.82 with the conversion of 66.4%

EXAMPLE 22

Ring-opening polymerization was undertaken in substantially the same manner as in Example 12, excepting that 1 mol % of n-hexene-1 was added as a molecular weight controlling agent to the 3,6-methylene-1,2,3,6-tetrahydro-cis-phthalic anhydride used as a monomer in Example 12. Upon completion of the reaction, the same aftertreatment was effected as in Example 12, providing a faintly brown transparent polymer having a reduced viscosity of 0.33 with the conversion of 92.5%.

EXAMPLE 23

Ring-opening polymerization was conducted in substantially the same manner as in Example 12, excepting that 1 mol % of butadiene was added as a molecular weight controlling agent to the 3,6-methylene-1,2,3,6-tetrahydro-cis-phthalic anhydride. Upon completion of the reaction, the same aftertreatment was applied as in Example 12, providing a faintly brown transparent polymer having a reduced viscosity of 0.33 with the conversion of 53.1%.

EXAMPLE 24

Ring-opening polymerization was undertaken in substantially the same manner as in Example 12, excepting that the 3,6-methylene-1,2,3,6-tetrahydro-cis-phthalic anhydride used as a monomer in Example 12 was replaced by 3,6-methano-1-methyl-1,2,3,6-tetrahydro-cis-phthalic anhydride.

Upon completion of the reaction, the same aftertreatment was effected as in Example 12, providing a faintly brown transparent polymer having a reduced viscosity of 0.14 with the conversion of 63.0%.

EXAMPLE 25

Ring-opening polymerization was carried out in substantially the same manner as in Example 12, excepting that the 3,6-methylene-1,2,3,6-tetrahydro-cis-phthalic anhydride used as a monomer in Example 12 was replaced by 5,8-methano-1,2,3,4,4a,5,8,8a-octahydronaphthalene-1,2-dicarboxylic anhydride. Upon completion of the reaction, the same aftertreatment was applied as in Example 12, providing a faintly brown polymer having a reduced viscosity of 0.25 with the conversion of 49.7%.

EXAMPLE 26

Ring-opening polymerization was conducted in substantially the same manner as in Example 12, excepting that the 3,6-methylene-1,2,3,6-tetrahydro-cis-phthalic anhydride used as a monomer in Example 12 was replaced by 1,4,5,8-dimethano1,2,3,4,4a,5,8,8a-octahydronaphthalene-2,3-dicarboxylic anhydride. Upon completion of the reaction, the same aftertreatment was effected as in Example 12, providing a faintly brown polymer having a reduced viscosity of 0.21 with the conversion of 54.4%.

EXAMPLE 27

Ring-opening polymerization was undertaken in substantially the same manner as in Example 12, excepting that the 3,6-methylene-1,2,3,6-tetrahydro-cis-phthalic anhydride used as a monomer in Example 12 was replaced by 4-(5-bicyclo[2,2,1]-hepta-2-enyl) phthalic anhydride. Upon completion of the reaction, the same aftertreatment was applied as in Example 12, providing a faintly brown polymer having a reduced viscosity of 0.21 with the conversion of 53.6%.

EXAMPLE 28

Ring-opening polymerization was carried out in substantially the same manner as in Example 12, excepting that 100 parts by weight of the 3,6-methylene-1,2,3,6-tetrahydro-cis-phthalic anhydride used as a monomer in Example 12 were replaced by a mixture of 50 parts by weight of 3,6-methylene-1,2,3,6-tetrahydro-cis-phthalic anhydride and 50 parts by weight of 5-cyano-bicyclo[2,2,1]-heptene-2. Upon completion of the reaction, the reaction system became solid to which 1000 parts by weight of dimethyl formamide were added to said reaction system containing the monomers, catalyst, solvent and polymer. When the mass was heated to 80° C, the polymer obtained was divided into an insoluble swollen portion and a soluble portion. The soluble portion was precipitated by adding a large amount of methyl alcohol. The precipitate was washed three times with methyl alcohol and dried 24 hours at 50° C and reduced pressure. The yield accounted for 54.2% for the soluble portion and 37.2% for the insoluble portion (the overall conversion was 91.4%). When hot pressed 3 minutes at 280° C and pressure of 50 Kg/cm$^2$, the polymer provided a transparent sheet. Determination was made of the physical properties of the sheet, the results being set forth in Table 1.

The purified polymer obtained by the above-mentioned process (containing a portion soluble in hot dimethyl formamide and a portion insoluble therein) was pulverized. Extraction of said polymer was carried out at 50° C for 24 hours in an aqueous solution of 1% by weight of sodium hydroxide. When hydrochloric acid was added to said aqueous solution containing the extracted polymer, a small amount of the polymer was precipitated. This precipitated polymer was treated with an aqueous solution of 1% by weight of sodium carbonate. Nuclear magnetic resonance analysis of said treated polymer showed that the resultant resonance spectrum substantially resembled that of FIG. 1 and that said polymer was more likely to consist of the homopolymer of the 3,6-methylene-1,2,3,6-tetrahydro-cis-phthalic anhydride. On the other hand, the infrared absorption analysis of the nonextracted portion of the polymer which was insoluble in said aqueous solution of sodium hydroxide showed the existence of the units of both monomers; though the homopolymer of 5-cyano-bicyclo[2,2,1]-heptene-2 was soluble in dimethyl formamide, the polymer obtained in Example 28 contained a portion insoluble therein; said insoluble portion contained the monomeric unit of 5-cyano-bicyclo[2,2,1]-heptene-2; as calculated from the yield, the non-extracted portion of the polymer contained a structural unit of the 3,6-methylene-1,2,3,6-tetrahydro-cis-phthalic anhydride, proving the formation of a copolymer of the above-mentioned two monomers. It is supposed from the foregoing description that the copolymer of this invention contains some amount of the homopolymer of one or the other of both monomers.

EXAMPLE 29

Ring-opening polymerization was carried out in substantially the same manner as in Example 28, excepting that 50 parts by weight of 5-cyano-bicyclo[2,2,1]-heptene-2 used as a monomer in Example 28 was replaced by 50 parts by weight of cyclooctene. Upon completion of the reaction, the reaction system became solid. When heated to 80° C after addition of 1000 parts by weight of dimethyl formamide, the polymer obtained was divided into a portion soluble in dimethyl formamide and a portion insoluble therein. The soluble portion was treated in the same manner as in Example 28 by adding a large amount of methyl alcohol. The yield was 26.4% for the soluble portion and 63.1% for the insoluble portion. (The overall conversion accounted for 89.5%.) The above-mentioned polymer was pulverized and treated, as in Example 28, with an aqueous solution of sodium hydroxide. The polymer was found to contain a small portion soluble in said aqueous solution. Nuclear magnetic resonance spectral analysis proved that said soluble portion consisted of a polymer resembling the homopolymer of 3,6-methylene-1,2,3,6-tetrahydro-cis-phthalic anhydride. The infrared absorption analysis and other investigations used in Example 28 indicated that the other portion insoluble in the aqueous solution of sodium hydroxide consisted of a copolymer.

Control 1

Ring-opening polymerization was conducted in substantially the same manner as in Example 12, excepting that the tungsten hexachloride used as a catalytic component in Example 12 was omitted (the catalytic system used consisted of diethyl aluminium chloride and acetaldehyde dimethyl acetal). After the polymerization reaction, the same aftertreatment was applied as in Example 12, yet no polymer was obtained.

Control 2

Ring-opening polymerization was carried out in substantially the same manner as in Example 12, excepting that the diethyl aluminium chloride used as a catalytic component in Example 12 was omitted (the catalytic system used consisted of tungsten hexachloride and acetaldehyde dimethyl acetal). After the polymerization reaction, the same aftertreatment was effected as in Example 12, yet no polymer was obtained.

What we claim is:

1. Resinous homopolymers prepared with a reduced viscosity of 0.1 to 20 measured at 30° C in a 1% by weight aqueous solution of sodium carbonate with the concentration of the polymers fixed at 0.2g/dl by ring-opening polymerization of acid anhydride type norbornene derivatives having a carboxylic anhydride group and selected from the group consisting of 3,6-methylene-1,2,3,6-tetrahydro-cis-phthalic anhydride; 6-(5-carboxy-bicyclo[2,2,1]-hepta-2-enyl) acetic anhydride; 3,6-methano-1-methyl-1,2,3,6-tetrahydro-cis-phthalic anhydride;2-oxa-1,4-dioxo-5,8-methano-1,2,3,4,4$a$,5,8,8$a$-octahydro-naphthalene; 5,8-methano-1,2,3,4,4$a$,5,8,8$a$-octahydronaphthalene-1,2-dicarboxylic anhydride; 5,8-methano-1-methyl-1,2,3,4,4$a$,5,8,8$a$-octahydronaphthalene-2,3-dicarboxylic anhydride; 1,4,5,8-dimethano-1,2,3,4,4$a$,5,8,,8$a$-octahydro-naphthalene-2,3-dicarboxylic anhydride; 2-oxa-1,3-dioxo-1,2,3,4,4$a$,5,8,8$a$,9,9$a$,10,10$a$-dodecahydroanthracene and 4-(5-bicyclo[2,2,1]-hepta-2-enyl) phthalic anhydride.

* * * * *